Dec. 7, 1965   W. D. AVERILL ETAL   3,221,404
CUTTING TOOL ADAPTER

Filed July 2, 1963   2 Sheets-Sheet 1

INVENTORS
WILLIAM D. AVERILL
DAVID I. McDONALD
BY
Howard O. Keiser
Jack J. Earl
ATTORNEYS Dec. 7, 1965    W. D. AVERILL ETAL    3,221,404
CUTTING TOOL ADAPTER
Filed July 2, 1963    2 Sheets-Sheet 2
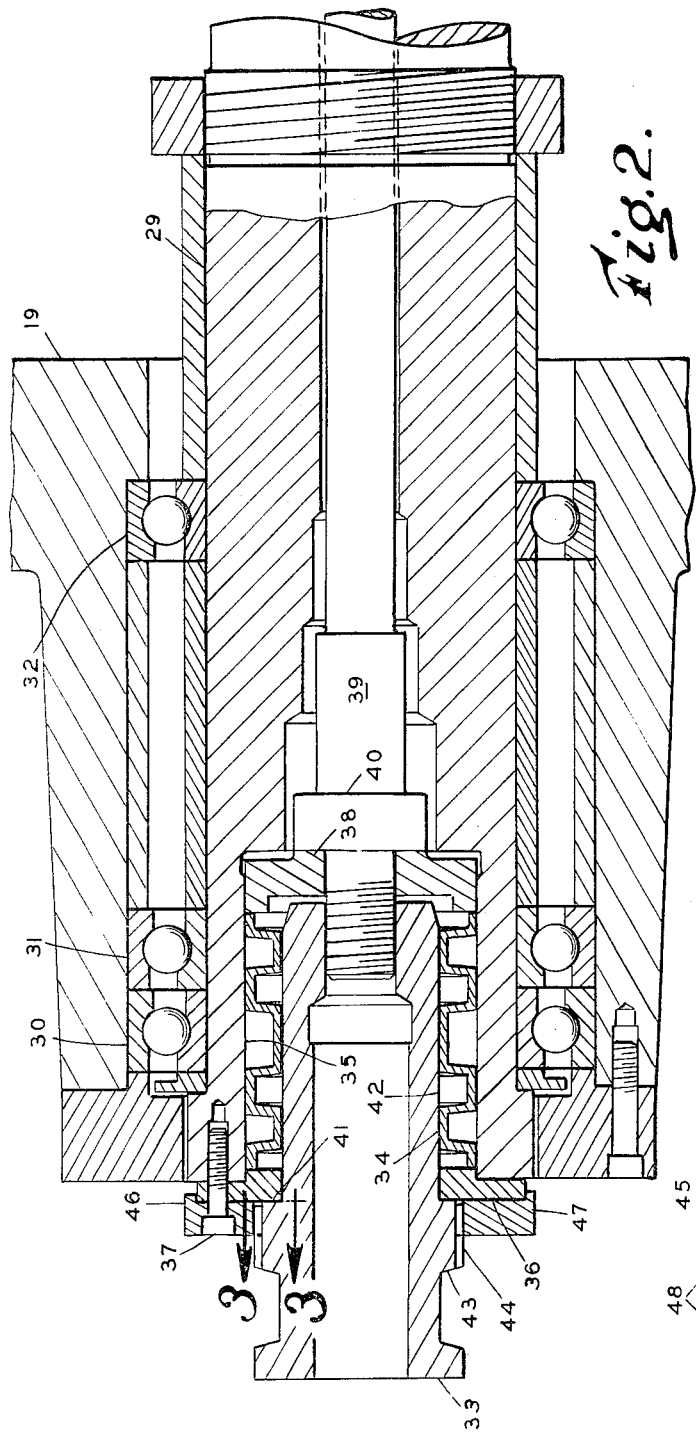
Fig. 2.
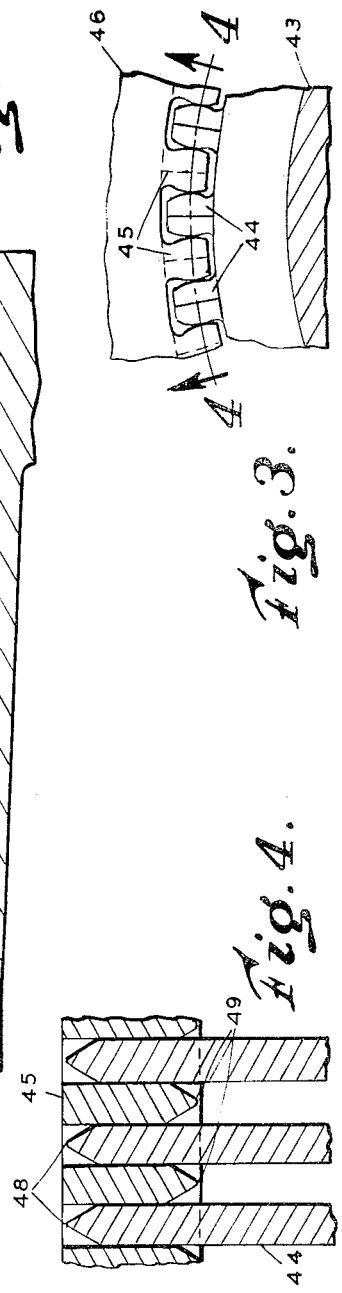
Fig. 3.
Fig. 4.

{ # United States Patent Office 3,221,404
Patented Dec. 7, 1965

3,221,404
CUTTING TOOL ADAPTER
William D. Averill and David I. McDonald, Cincinnati, Ohio, assignors to The Cincinnati Milling Machine Co., Cincinnati, Ohio, a corporation of Ohio
Filed July 2, 1963, Ser. No. 292,258
10 Claims. (Cl. 29—568)

This invention relates to a cutting tool adapter for machine tools and more particularly to an adapter especially suited for use in a machine tool having mechanism to automatically change cutting tools in the machine spindle.

In the automatic exchange of cutting tools in a spindle with tools stored in a magazine, problems arise as to the exact positioning of a cutting tool in the spindle so that it may be rotatably fixed therein and so that the end of the cutting tool will be at a known position with reference to the spindle. In machine tools developed previously to automatic tool changers, large keys and keyways are normally used with tool adapters to rotatively fix the tool in the spindle so that torque can be transmitted positively therebetween and with this arrangement the angular position of the tool adapter for insertion in spindle is fixed. The angular position of the tool as it is inserted in the machine spindle is manually controlled by the machine operator with little difficulty. However, these key driven tool adapters are not readily suited for automatic tool changers. They require that the angular position of a tool be constantly tracked or maintained in a predetermined relationship during tool transfer and storage in the magazine. The angular position of the spindle when stopped must be known and must correspond to the angular position of the tool adapter as it is inserted. Keeping track of this information and maintaining the angles are difficult tasks requiring rather complicated mechanisms. It is equally important in automatic machines of the numerically controlled type that a tool be firmly and positively held in a preset axial location in the tool adapter which then must be accurately positioned and clamped at a known place in the spindle such that the machine program and tool position correspond to produce the desired workpiece dimensions.

With these difficulties and problems in mind, it is an object of this invention to provide a tool adapter for use in a machine tool spindle which can be inserted axially into the spindle with a minimum of effort and without regard to the relative angular position of the tool adapter and spindle. It is also an object of this invention to provide a tool adapter for automatic tool changing machines in which there is a positive transmission of torque between the tool adapter and the spindle to prevent relative rotation therebetween. A further object of this invention is to provide an improved adapter in which the cutting tool position can be preset to a selected axial spot so that the tool will be at a known location when the adapter is secured in the spindle of a machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In accordance with the preferred form of this invention, an adapter body having a cylindrical surface for insertion into a spindle is furnished with a collar member having axially aligned teeth therein that slide into mating and complementary contact with a set of teeth of a drive member fixed to the end of the spindle and around the socket into which the adapter is axially inserted. At least one of the toothed members has teeth extending around a complete circle so that the angular position of the adapter as it is inserted in the spindle is not critical. Moreover, in the preferred form, the teeth of the two members are involute in form and chamfered at the ends thereof which initially engage as the adapter is inserted into the spindle such that the teeth will align themselves for intermeshing as they are moved together. The adapter is also furnished with an adjustable tool locating surface so that a tool can be positioned selectively and exactly in the adapter which in turn has a fixed locating surface that establishes the adapter at a known position in the spindle. A clear understanding of the construction and use of the adapter mechanism of this invention can be obtained from the following detailed description in which reference is made to the attached drawings wherein:

FIG. 2 is a section of the spindle of the machine of FIG. 1 taken on line 2—2 thereof.

FIG. 3 is a section of the spindle and tool adapter mechanism on line 3—3 of FIG. 2.

FIG. 4 is a section of the structure shown in FIG. 3 taken on line 4—4 thereof.

Figure 1:
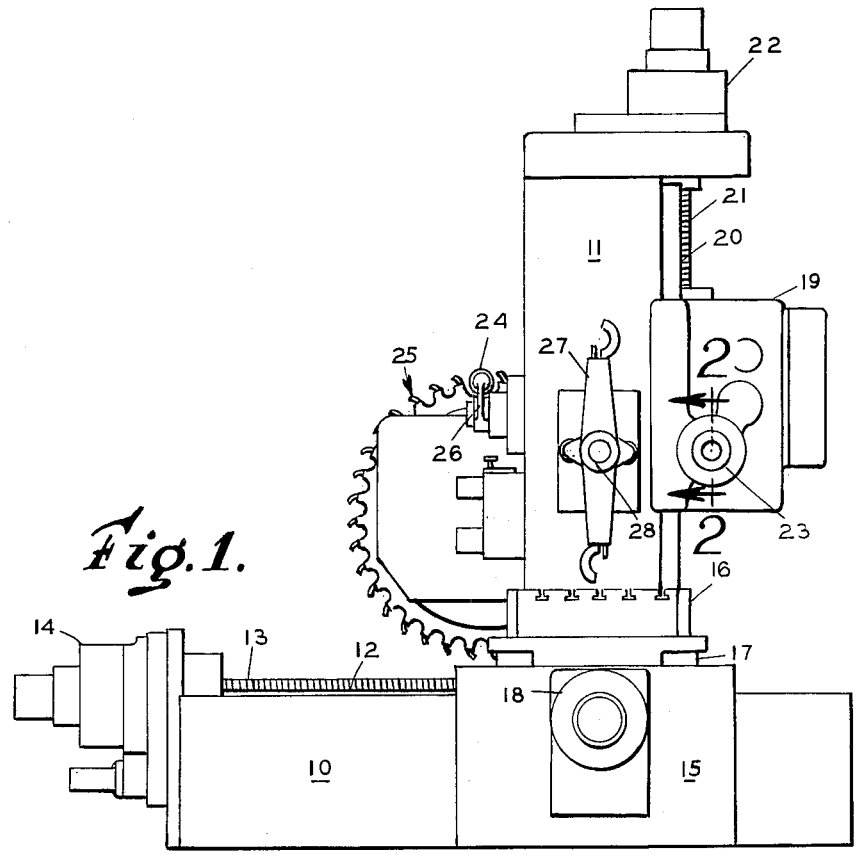
FIG. 1 is a front elevation of an automatic tool changing milling machine.

The present invention is described for use in the machine of FIG. 1 which is a machine like that shown in copending U.S. application Serial Number 261,670 filed by Lewis A. Dever and assigned to the assignee of the present invention. The machine is comprised of a base 10 on which a column 11 is reciprocally slidable on ways 12 through the rotation of a screw 13 by a motor 14, the screw 13 being engaged through a nut (not shown) fixed to the column 11. A wing base 15 extends forward from the base 10 and supports a table 16 on ways 17 for slidable movement toward and away from the ways 12 on the base 10 by operation of a motor 18 to relatively rotate a screw and nut mechanism (not shown) linked between the wing base 15 and table 16. The column 11 includes vertical ways 20 on which a spindle carrier 19 is supported by a screw 21 that is threaded through the spindle carrier 19 and rotatable relative to the column 11 by a motor 22 to effect vertical movement of the spindle carrier 19. A spindle mechanism 23 is included in the carrier 19 and the spindle mechanism 23 is adapted to receive tools 24 from a magazine 25 supported on the back of the column 11 by operation of a tool transfer mechanism including a pair of arms 26 and 27. As described in the cited patent application, the arm 26 removes and replaces tools in the magazine 25 and shifts them between the magazine 25 and a position forward of the column 11 where they are picked up and deposited by the double ended arm 27. The arm 27 is pivotal with the shaft 28 which is also axially movable parallel to the axis of the spindle mechanism 23 to insert tools 24 therein and to withdraw them therefrom. The arm operates to remove one tool from the spindle 23 and to move it to the arm 26 in the forward position while simultaneously picking up a second tool from the arm 26 and moving it into the spindle 23.

The detail of the spindle mechanism 23 is shown in FIG. 2. A spindle 29 is rotatable in bearings 30, 31, 32 received in the carrier 19. The forward end of the spindle 29 is adapted to receive and hold a tool adapter body 33. The adapter body 33 is axially insertable into a clamping bushing 34 which is retained in a recess 35 in the spindle 29 by a ring member 36 fixed to the spindle end by machine screws 37. The rear of the bushing 34 is engaged by a washer 38 loosely received over the threaded end of a draw bar 39 which includes a shouldered flange 40 to press the washer 38 against the bushing 34 when the draw bar 39 is threaded into the rear of the adapter body 33 to pull it into the spindle 29 until a shoulder 41 thereon is firmly held against the front of the ring member 36. The washer 38 acts against the bushing 34 to cause it to grip a cylindrical surface 42 of the adapter body 33. As can be seen in FIG. 2 and in detail in FIGS. 3 and 4, the adapter body 33 includes a collar portion 43, the rear of which is formed by the shoulder 41. The collar 43 extends outward from and around the body 33. The peripheral surface of the collar 43 has teeth 44 formed therein in axial alignment with the axis of the spindle 29. The teeth 44 are in mesh with teeth 45 formed in sector members 46, 47 fixed on the ring member 36 and the teeth 45 in each of these members 46, 47 extend only partially around the recess 35 into which the adapter body 33 is inserted. As shown best in FIG. 4, the rear ends of the teeth 44 are chamfered to points 48 adjacent the shoulder 41 while the forward ends of the teeth 45 are chamfered to points 49 such that when the adapter body 33 is axially drawn into the spindle 29, the teeth 44, 45 will align themselves and slide into mesh together. In the preferred embodiment shown, the teeth 44, 45 are involute gear teeth with a common pitch circle, the pitch circle corresponding to the arc on which the section of FIG. 4 is taken and designated line 4—4 in FIG. 3. With the teeth 44, 45 as described, the adapter body 33 can be inserted axially into the spindle 29 at any angle relative thereto and the teeth 44, 45 will mesh to provide the positive drive between the spindle 29 and the adapter body 33 which is required in metal cutting operations including heavy milling cuts at high cut speeds. In addition to providing the positive drive required, the involute form of teeth provides a self centering effect on the tool adapter in the spindle and gives an even distribution of the forces between intermeshed teeth. The combination of involute teeth and chamfered ends also allows the adapter to slide easily into the spindle.

Figure 5:
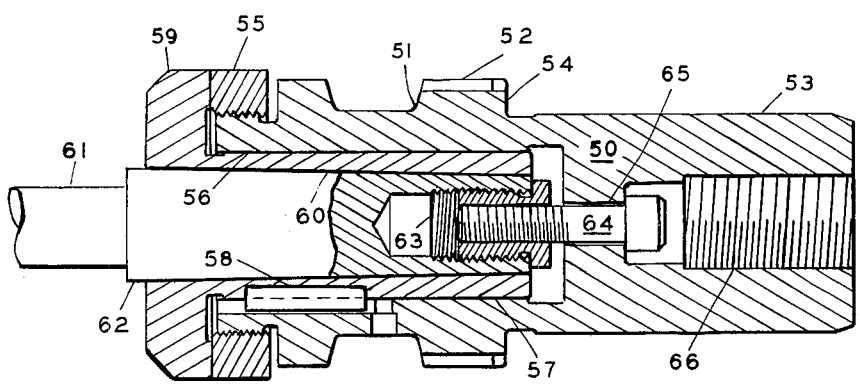
FIG. 5 is a longitudinal section of a tool adapter according to this invention with a tool positioned therein.

A preferred embodiment of the complete tool adapter is shown in detailed section in FIG. 5. This adapter has a body 50 also having a collar 51 extending therefrom on which involute teeth 52 are formed in the peripheral surface therearound. A cylindrical surface 53 is formed on the rear end of the adapter body 50 for receipt in a spindle such as the spindle 29 described. A shoulder 54 at the rear of the collar 51 and adjacent the surface 53 forms a locating surface such that the adapter body can be inserted into the spindle 29 to a predetermined location relative thereto. The forward end of the adapter body 50 has a nut 55 threaded thereover and a recess 56 is formed centrally in the forward end to recieve a bushing 57. There is a key 58 received between the bushing 57 and the adapter body 50 to prevent relative rotation between them. The bushing 57 also has a flange 59 which extends outward to engage against a side of the nut 55 when the bushing is drawn into the body 50. The bushing has a tapered recess 60 in which a tool 61 having a tapered shank 62 is inserted. The rear end of the tapered shank 62 is threaded and an adapter bushing 63 is threadedly engaged and firmly seated therein. The bushing 63 is in turn threadedly engaged by a machine screw 64 loosely received through an opening 65 from a threaded recess 66 at the rear of the body 50 into which a draw bolt such as the draw bolt 39 described is engageable. The screw 64 is turned into the bushing to pull the tool shank 62 tightly into the bushing 57 and the bushing 57 is in turn pulled into the body 50 until the flange 59 is seated firmly against the nut 55. It can be seen that the position of the nut 55 on the body 50 determines the axial position at which the bushing 57 and tool 61 are held relative to the body 50 and since the shoulder 54 determines the position of the adapter body in the spindle 29, the tool 61 can be preset to extend from the spindle 29 a predetermined amount by selected location of the nut 55 prior to the insertion of the body 50 into the spindle 29.

What is claimed is:

1. A tool holder for adapting a cutting tool for use in a machine tool spindle, the holder comprising in combination:
   (a) a body adapted for receipt in the spindle of the machine,
   (b) a recess in said body to receive the cutting tool and including means to fix the cutting tool at a predetermined fixed location in the body, and
   (c) a collar extending outward from said body and having uniform teeth formed in and spaced on the periphery thereof for transfer of torque between said body and the machine spindle.

2. A tool holder for adapting a cutting tool for use in a machine tool spindle, the holder comprising in combination:
   (a) a body having a cylindrical surface at one end adapted for receipt in the machine spindle,
   (b) a recess in the other end of said body to receive the cutting tool and including means to fix the cutting tool at a predetermined location in the body, and
   (c) a collar around said body and intermediate to the ends thereof having a plurality of axially oriented involute gear teeth formed in and spaced around the periphery thereof for transfer of torque between said body and the machine spindle,
       (1) each of said teeth chamfered at the end adjacent to said cylindrical surface.

3. A tool holder for adapting a cutting tool for use in a machine tool spindle, the holder comprising in combination:
   (a) a body having a cylindrical surface at one end adapted for receipt in the machine spindle,
   (b) a recess in said body at the other end thereof to receive the cutting tool and including means to fix the cutting tool at a predetermined location in the body,
   (c) a collar around said body and intermediate to the ends thereof having uniform axially oriented teeth formed in and spaced around the periphery thereof for transfer of torque between said body and the machine spindle, and
   (d) a shoulder surface between said collar and said cylindrical surface to form a locating surface for positioning said body at a fixed axial location in the spindle.

4. A tool holder for adapting a cutting tool for use in a machine tool spindle, the holder comprising in combination:
   (a) a body having a cylindrical surface on one end adapted for receipt in the machine spindle,
   (b) a recess in said body at the end opposite to said cylindrical surface to receive the cutting tool and including means to fix the cutting tool at a predetermined location in the body.
   (c) a collar around said body and intermediate to the ends thereof having axially oriented involute gear teeth formed in and spaced around the periphery thereof for transfer of torque between said body and the machine spindle,
       (1) each of said teeth chamfered at the end adjacent to said cylindrical surface, and
   (d) a shoulder surface on said collar at the end thereof adjacent to said cylindrical surface to form a locating surface for positioning said body at a fixed axial location in the spindle.

5. A tool holder for adapting a cutting tool for use in a machine tool spindle, the holder comprising in combination:
   (a) a body having one end adapted for receipt in the spindle, (b) a recess in the other end of said body, (c) means to locate the cutting tool in a predetermined axial position in the body recess and to clamp the cutting tool rigidly in that predetermined position, (d) a collar around said body intermediate to the ends thereof having a plurality of axially oriented involute teeth formed in and spaced around the periphery thereof for transfer of torque between said body and the spindle, (1) each of said teeth chamfered at the end thereof toward said one end of the body, and (e) a shoulder surface on said collar at the end adjacent to said one end of the body to form a locating surface for positioning said body at a fixed axial location in the spindle whereby the cutting tool is held in a known position relative to the spindle.

6. A tool holder for adapting a cutting tool for use in a machine tool spindle, the holder comprising in combination:

(a) a body having one end adapted for receipt in the spindle, (b) a recess in the other end of said body, (c) a bushing adapted for insertion into said body recess and having a flange extending around said other end of said body, (d) a nut threadedly engaged on the body at said other end thereof and adapted to engage said flange, (e) a tapered socket in said bushing adapted to receive the cutting tool, (f) a threaded member loosely received through said body from said one end thereof and engaged with said tool, (1) said gear member having a plurality of involsaid bushing and cutting tool at a predetermined axial position in said body, (g) a collar around said body intermediate to the ends thereof having a plurality of axially oriented involute teeth formed in and spaced around the periphery thereof for transfer of torque between said body and spindle, (1) each of said teeth chamfered at the end adjacent to said one end of the body, and (h) a shoulder surface on said collar at the end adjacent to said one end of the body to form a locating surface for positioning said body at a fixed axial location in the spindle whereby the cutting tool is held in a known position relative to the spindle.

7. In a machine tool spindle, a mechanism to hold a cutting tool therein for rotation therewith comprising in combination:

(a) an axial recess in one end of the spindle, (b) a gear member attached to the spindle at said one end;

(1) said gear member having a plurality of involute teeth parallel to the axis of the spindle and circumferentially arranged around said spindle recess, (c) a tool adapter body having one end adapted for receipt in said spindle recess, (1) said adapter body having means to fix the cutting tool therein, and (d) a collar extending from said adapter body adjacent to said one end thereof, (1) said collar having involute teeth formed thereon to slide axially in mesh with the teeth of said gear member when the adapter body is inserted into said spindle recess, (2) said gear member teeth and said collar teeth coacting to prevent the adapter body from rotating in the spindle.

8. In a machine tool spindle, a mechanism to hold a cutting tool therein for rotation therewith comprising in combination:

(a) an axial recess in one end of the spindle, (b) a gear member attached to the spindle at said one end, (1) said gear member having a plurality of internal involute teeth parallel to the axis of the spindle and circumferentially arranged around said spindle recess on a predetermined pitch circle, said teeth chamfered at their outer ends away from said one end of the spindle, (c) a tool adapter body having one end adapted for receipt in said spindle recess, (1) said adapter body having means to fix the cutting tool therein, and (d) a collar extending from said adapter body adjacent to said one end thereof, (1) said collar having external involute teeth thereon arranged on said predetermined pitch circle and chamfered on the end thereof adjacent said one end of the adapter body to slide axially into mesh with the teeth of said gear member when the adapter body is inserted into said spindle recess, (2) said teeth coacting to prevent the adapter body from rotating in the spindle.

9. In a machine tool spindle, a mechanism to hold a cutting tool therein for rotation therewith comprising in combination:

(a) an axial recess in one end of the spindle, (b) a plurality of gear sector members spaced around and attached to the spindle at said one end, (1) each of said sector members having a plurality of internal involute teeth parallel to the axis of the spindle and circumferentially arranged on a predetermined pitch circle, the teeth of said sector members chamfered at their outer end away from the spindle, (c) a tool adapter body having one end adapted for receipt in said spindle recess, (1) said adapter body having means to fix the cutting tool therein, and (d) a collar extending around said adapter body adjacent to said one end thereof, (1) said collar having external involute teeth therearound arranged on said predetermined pitch circle and chamfered at the end adjacent said one end of the adapter body to effect easy axial intermeshing of the teeth of said sector members and collar when said adapter body is axially inserted into said spindle recess on a random angle, (2) said teeth coacting to prevent the adapter body from rotating in the spindle.

10. In combination with a machine tool spindle, the mechanism comprising:

(a) an axial recess in one end of the spindle, (b) a gear member attached to the spindle at said one end, (1) said gear member having a plurality of involute teeth parallel to the axis of the spindle, chamfered on the end thereof away from the spindle, and circumferentially arranged around said spindle recess, (c) a tool adapter body having one end adapted for receipt in said spindle recess, (d) a cutting tool fixed in the other end of said adapter body, (e) a collar extending from said adapter body intermediate to the ends thereof, (1) said collar having involute teeth formed thereon chamfered on the ends thereof adjacent to said one end of the adapter body to slide axially in mesh with the teeth of said gear member when the adapter body is inserted axially into said spindle recess at a random angle, (f) a storage magazine adapted to hold said adapter body at a location spaced from the spindle, and (g) mechanism operable to remove said adapter body from said magazine, transfer said adapter body to the spindle, and insert said adapter body axially into the spindle recess,
   (1) said gear member teeth and collar teeth coacting to prevent the adapter body from rotating in the spindle.

References Cited by the Examiner
UNITED STATES PATENTS
2,533,758   12/1950   Better.

FOREIGN PATENTS
618,470   2/1949   Great Britain.

RICHARD H. EANES, *Primary Examiner.*